June 24, 1969     C. R. LANG     3,451,213

ENGINE EXHAUST VALVE CAM

Filed Jan. 2, 1968     Sheet 1 of 2

INVENTOR.
CHARLES R. LANG
BY
John R. Faulkner
Robert E. McCollum
ATTORNEYS

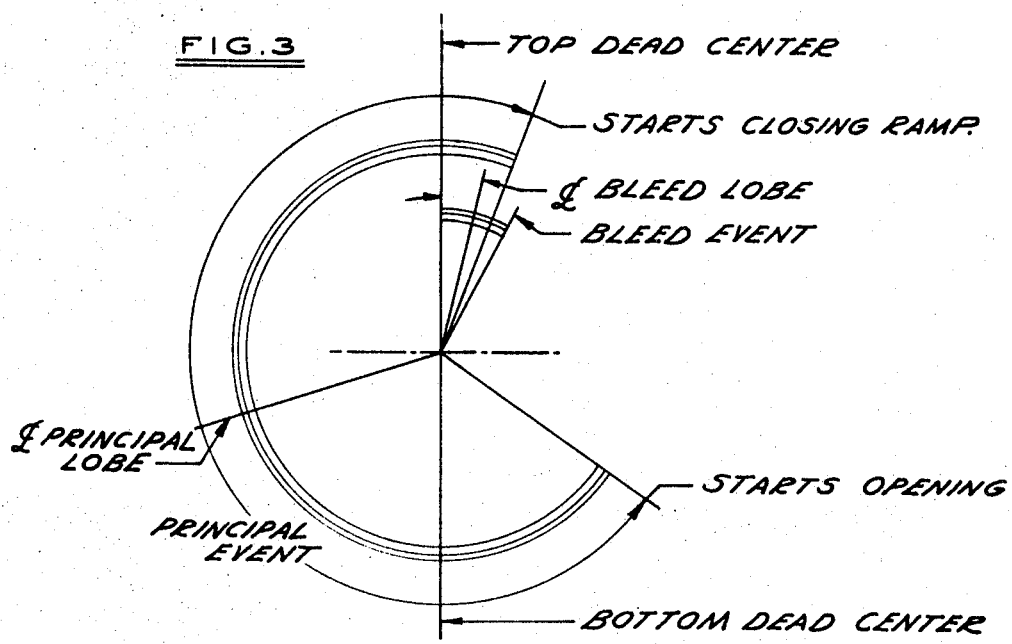
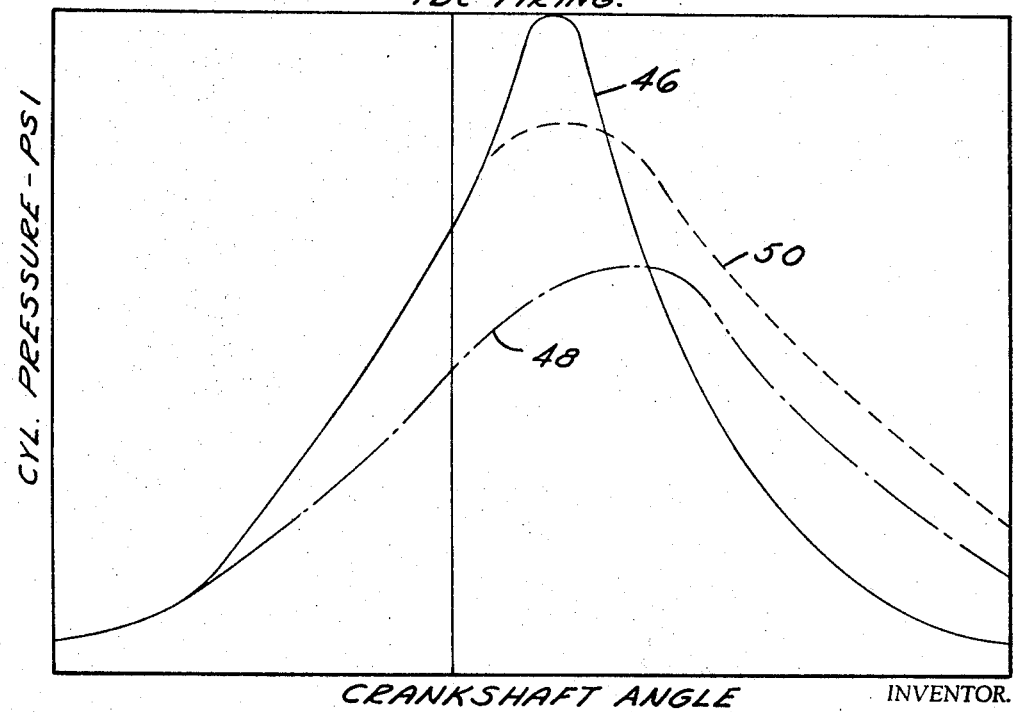

United States Patent Office 3,451,213
Patented June 24, 1969

3,451,213
ENGINE EXHAUST VALVE CAM
Charles R. Lang, Inkster, Mich., assignor to Ford Motor Company, Dearborn, Mich., a corporation of Delaware
Filed Jan. 2, 1968, Ser. No. 695,067
Int. Cl. F02b 75/10; F01l 1/08
U.S. Cl. 60—29                                  9 Claims

ABSTRACT OF THE DISCLOSURE

An internal combustion engine exhaust valve cam having a principal lobe opening the exhaust valve in the normal manner during the engine exhaust stroke, and a secondary lobe spaced from the principal lobe such as to momentarily open the exhaust valve at the beginning of the engine power stroke to bleed a portion of the burning charge into the exhaust system to reduce the emission of smog producing elements into the atmosphere.

---

This invention relates, in general, to an internal combustion engine exhaust system. More particularly, it relates to an internal combustion engine exhaust valve train construction that reduces the emission of unburned hydrocarbons and oxides of nitrogen into the atmosphere, as well as other harmful smog producing elements.

Much emphasis has been placed on providing a clean exhaust gas for an internal combustion engine that minimizes the emission of harmful smog producing elements into the atmosphere. The most recent commercial attempts along this line have been to provide internal combustion engines either with improved carburetion or systems injecting additional clean air into the exhaust port area of each engine cylinder. The latter chemically combines with the unburned hydrocarbons and other harmful elements in the exhaust gas stream and reduces these to less harmful forms. However, these attempts generally require the addition to the engine of mechanism that are costly to manufacture, require frequent adjustments to maintain in satisfactory operating condition, and generally rob the engine of useful engine horsepower.

The present invention provides a simple yet effective solution to the above problem. More specifically, the invention relates to an engine exhaust valve cam design that momentarily opens the exhaust valve at the beginning of the piston power stroke to reduce peak cylinder pressure by bleeding a portion of the burning charge into the exhaust passage, thereby reducing further formation of oxides of nitrogen in the chamber, minimizing the presence of unburned hydrocarbons in the residual gases in the combustion chamber, and converting unburned hydrocarbons and other smog producing elements present in the exahust manifold to less harmful forms. The invention accomplishes the above by the addition of a secondary lobe to the exhaust valve cam that momentarily opens the exhaust valve when the piston is essentially at the top dead center position between the compression and power strokes.

Other features and advantages of the invention will become more apparent upon reference to the succeeding detailed description thereof, and to the drawings illustrating a preferred embodiment thereof, wherein:

FIGURE 3 is a diagram illustrating the cam timing for opening and closing of the exhaust valve shown in FIGURES 1 and 2; and, FIGURE 4 illustrates graphically the changes in cylinder pressure with changes in crankshaft angle for an internal combustion engine embodying the invention as compared to high and low compression engines having conventional exhaust cam designs.

As stated above, the invention relates to an engine exhaust valve cam design that reduces the emission of smog producing elements by bleeding peak cylinder combustion pressure to retard the formation of oxides of nitrogen while at the same time utilizing the high temperature of the combustion products bled to oxidize the pollutants in the exhaust system.

Figure 1:
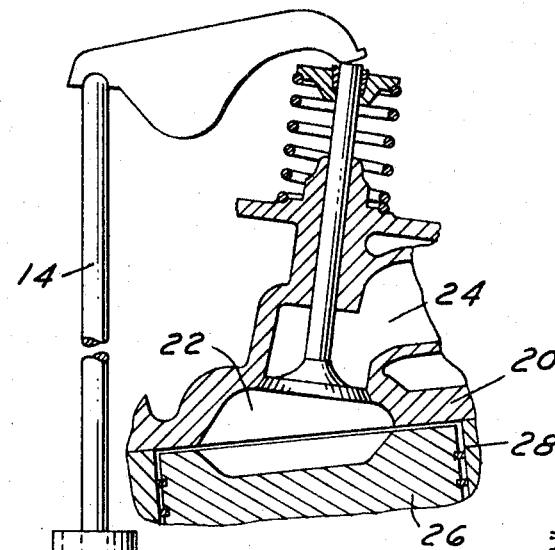
FIGURE 1 illustrates, schematically, a cross-sectional view of an internal combustion engine exhaust valve train embodying the invention.

More specifically, FIGURE 1 shows an exhaust valve train for an internal combustion engine. It includes the usual hydraulic or mechanical tappet 12 connected by a push rod 14 to one end of a pivotally mounted rocker arm 16. The opposite end of arm 16 bears against the stem end of a spring closed exhaust valve 18. The latter valve is slidably guided in a known manner through the cylinder head 20 of the engine to permit an outward flow at times of the products of combustion from a combustion chamber 22 into an exhaust gas passage 24. Combustion chamber 22 is defined by the walls of cylinder head 20 and the top of a dish-faced piston 26 that is reciprocably mounted in the engine block 28.

The valve train is actuated by an exhaust cam 30 that is fixed on a camshaft 32 rotated by a geared connection 34 to the engine crankshaft 36. Further details of construction and operation of the valve train are not given since they are known and believed to be unnecessary for an understanding of the invention.

Figure 2:
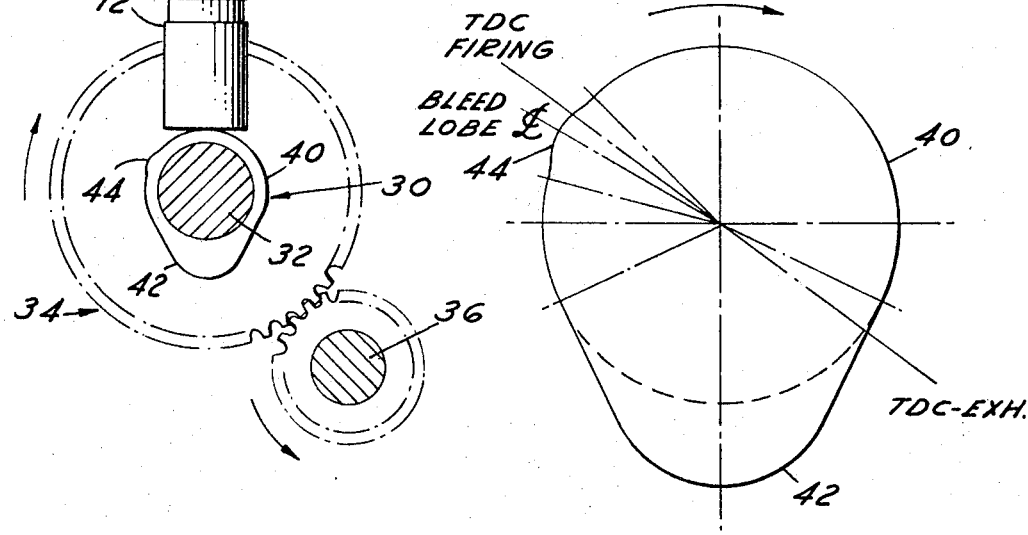
FIGURE 2 is an enlarged view of a detail of FIGURE 1.

Referring now to both FIGURES 1 and 2, exhaust cam 30 has the usual concentric base circle surface 40 and a principal lobe 42, the peripheral surface of the latter lifting tappet 12 to open exhaust valve 18 during the exhaust stroke of piston 26, in a known manner. The principal lobe is circumferentially located, relative to the top dead center positions of piston 26 during both the exhaust and firing strokes, as indicated in FIGURE 2, so that during conventional operation, the exhaust valve will be closed, in so far as the principal lobe is concerned, during the compression and power strokes of the piston.

The exhaust cam, however, also includes a second lobe 44 of essentially symmetrical contour or profile that is so circumferentially spaced and located from principal lobe 42 that it is operative when the piston is essentially at its top dead center position at the beginning of the power stroke to momentarily open the exhaust valve to bleed cylinder pressure at this time. This operation is explained more fully hereafter.

FIGURE 3 illustrates the timing diagram for the exhaust valve cam 30. It indicates that principal lobe 42 lifts and permits the return of the exhaust valve 18 in a conventional manner, starting the opening of the valve at say, 35°, for example, before bottom dead center position of the piston near the end of its power stroke, maintaining the exhaust valve open during the entire upward exhaust stroke movement of the piston, and closing the valve at a point slightly beyond top dead center after the piston has started down on its intake stroke.

The valve remains closed during the upward compression stroke until just slightly after firing has occured near the piston top dead center position. It is at this point and time that the secondary bleed lobe 44 momentarily opens exhaust valve 18 to bleed some of the burning charge at peak cylinder pressure into the exhaust passage.

This momentary opening of the exhaust valve reduces the cylinder pressure and temperature, and thereby minimizes the further formation of oxides of nitrogen that are normally formed at high compression pressures and temperatures. Simultaneously, the reduction of temperature reduces the density of the mixture in the chamber, thereby reducing the burn rate of the mixture. The lower burn rate then permits a more complete burning of the charge in the chamber, with a consequential reduction of residual unburned hydrocarbons in the quench zone and in the layer of gas attached to the combustion chamber walls. Thus, in the combustion chamber proper, the bleeding of the burning charge at peak cylinder pressure provides a more complete combustion and a resultant minimization of residual unburned hydrocrabons and other harmful smog producing elements.

Concurrently, the bleeding of the small amount of the burning charge into the exhaust passage immediately increases the temperature in the exhaust system and helps oxidize any other unburned charge that may exist in the exhaust manifold; i.e., it promotes oxidation in the exhaust system.

FIGURE 4 illustrates the changes in cylinder pressure with changes in the rotation of the crankshaft for typical high and low compression engines as compared to the engine embodying the invention. That is, curve 46 illustrates graphically the higher peak cylinder pressure and faster rate of fall off for a typical high compression, high performance engine that promotes the high emission of undesirable smog producing elements. That is due primarily to the high rate of burn of the combustion chamber charge going to completion quickly, with the rate of drop off, in general, being too fast to properly reduce the formation of unburned hydrocarbons etc. in the exhaust system.

Curve 48, on the other hand, illustrates the changes in cylinder pressure for a typical low compression, lower temperature engine, with retarded spark, that provides a slower burning rate and a consequential lower volume emission of smog producing elements.

The curve 50 illustrates the changes in cylinder pressure of an engine incorporating or embodying the valve train design of the invention. The curve indicates an engine that provides both high compression and performance with optimum spark timing, and yet, because of bleed off of cylinder pressure, provides excellent exhaust emission control, in the manner described.

From the foregoing, therefore, it will be seen that the invention provides an internal combustion engine exhaust valve cam design that substantially reduces the production and/or emission of undesirable smog producing elements into the atmosphere through the exhaust system, and yet sacrifices only a portion of the performance of the engine to obtain these results.

While the invention has been described and illustrated in its preferred embodiment, it will be clear to those skilled in the arts to which it pertains that many changes and modifications may be made thereto without departing from the scope of the invention.

I claim:

1. An exhaust emission control for an internal combustion engine having a combustion chamber slidably receiving a reciprocatable piston therein and having an exhaust valve train including a cam operated, spring closed exhaust valve controlling the exhaust of the products of combustion from said chamber, the improvements comprising:

said exhaust cam having a primary lobe shaped to open said exhaust valve slightly ahead of the bottom dead center position of said piston during its power stroke and to close said valve slightly beyond the top dead center position of said piston during its intake stroke, and a secondary lobe so shaped and circumferentially spaced from said primary lobe as to open said exhaust valve momentarily when said piston is adjacent its top dead center position at the end of its compression stroke.

2. An exhaust emission control as in claim 1, said secondary lobe having a symmetrical profile and beginning the opening of said exhaust valve at the top dead center position of said piston.

3. An exhaust emission control as in claim 1, said secondary lobe opening said exhaust valve at the top dead center position of said piston during combustion operation and subsequently closing said valve during the piston power stroke at a position slightly beyond the after top dead center position at which the exhaust valve is closed during the exhaust stroke of the piston.

4. An exhaust emission control to bleed cylinder pressure from the combustion chamber of a four cycle internal combustion engine during the combustion period of said engine, said engine having an exhaust valve train including a cam operated, spring closed exhaust valve, the improvement comprising:

an exhaust cam having an annular peripheral surface comprising first and second concentric base circular surface portions, a first cam surface portion interposed between said first and second portons extending radially beyond said latter surface portions and a second cam surface portion between said secand first surface portions in the sequence named around said annular surface, said second cam surface portions extending radially beyond said first and second portions.

said second cam surface portion being located on said annular surface so as to open said exhaust valve momentarily during the combustion period of said engine to bleed off a portion of the burning charge.

5. An exhaust emission control as in claim 4, said second cam portion extending radially beyond said concentric surface portions to an extent less than the radial extent of said first cam portion.

6. An exhaust emission cosntrol as in claim 4, the centerline of said second cam surface being spaced circumferentially from the centerline of said first cam surface within a range of 100°–140° rotation of said cam.

7. An exhaust emission control as in claim 4, said cam surfaces each having an essentially symetrical profile.

8. An exhaust emission control as in claim 4, said second cam surface being located so as to open said exhaust valve at the top dead center position of the piston of said engine at the beginning of the power stroke of said engine.

9. An exhaust emission control as in claim 8, said second cam surface closing said exhaust valve during the power stroke of said engine and at a relative after top dead center location slightly beyond the opening position of said second cam surface.

References Cited

UNITED STATES PATENTS

| 1,152,361 | 8/1915 | Thomas | 60—13 |
|---|---|---|---|
| 2,344,993 | 3/1944 | Lysholm | 123—105 |
| 2,647,500 | 8/1953 | Lang | 123—182 |
| 2,999,491 | 9/1961 | Harkness. | |
| 3,272,189 | 9/1966 | Turkish. | |
| 3,298,332 | 1/1967 | Elsbett. | |
| 3,306,276 | 2/1967 | Harkness et al. | 123—182 |
| 3,415,055 | 12/1968 | Guarnaschelli | 60—29 |

FOREIGN PATENTS 590,854  7/1947  Great Britain.

AL LAWRENCE SMITH, *Primary Examiner.*

U.S. Cl. X.R.

123—75, 90, 182